US012755557B2

(12) United States Patent
Jagbrant et al.

(10) Patent No.: US 12,755,557 B2
(45) Date of Patent: Oct. 6, 2026

(54) VISION SYSTEM AND METHOD FOR A MOTOR VEHICLE

(71) Applicant: QUALCOMM AUTO LTD., Cambridge (GB)

(72) Inventors: Gustav Lars Henrik Jagbrant, Linköping (SE); Per Cronvall, Linköping (SE)

(73) Assignee: Qualcomm Auto Ltd., Cambridge (GB)

( * ) Notice: Subject to any disclaimer, the term of this patent is extended or adjusted under 35 U.S.C. 154(b) by 391 days.

(21) Appl. No.: 17/998,602

(22) PCT Filed: Jun. 7, 2021

(86) PCT No.: PCT/EP2021/065158
§ 371 (c)(1),
(2) Date: Nov. 11, 2022

(87) PCT Pub. No.: WO2021/249939
PCT Pub. Date: Dec. 16, 2021

(65) Prior Publication Data

US 2023/0186644 A1 Jun. 15, 2023

(30) Foreign Application Priority Data

Jun. 12, 2020 (EP) .................................... 20179761

(51) Int. Cl.
*G06V 20/58* (2022.01)
*B60W 50/16* (2020.01)
(Continued)

(52) U.S. Cl.
CPC ........... *G06V 20/582* (2022.01); *B60W 50/16* (2013.01); *B60W 60/0053* (2020.02); (Continued)

(58) Field of Classification Search
CPC .... G06V 20/582; G06V 10/82; G06V 10/764; B60W 60/0053; B60W 50/16;
(Continued)

(56) References Cited

U.S. PATENT DOCUMENTS

2012/0162429 A1* 6/2012 Wuerz-Wessel ...... G06F 18/211 348/148
2014/0327772 A1 11/2014 Sahba
(Continued)

OTHER PUBLICATIONS

Chen., L., et al., "Real-Time Traffic Sign Classification Using Combined Convolutional Neural Networks", 2017 4th IAPR Asian Conference on Pattern Recognition, IEEE, Nov. 26, 2017, XP033475288, pp. 399-404.
(Continued)

*Primary Examiner* — Syed Haider
(74) *Attorney, Agent, or Firm* — Qualcomm Auto Ltd.

(57) ABSTRACT

A vision system for a motor vehicle comprises an imaging apparatus (11) adapted to capture images (30) from a surrounding of the motor vehicle, and a data processing unit (14) adapted to perform image processing on images (30) captured by said imaging apparatus (11). The data processing unit (14) comprises a traffic sign detector (31) adapted to detect traffic signs in images (30) captured by said imaging apparatus (11) through image processing, a decision section (35) and a traffic sign estimator (36) that is adapted to estimate validity information (37) of one or more traffic signs in an image (30) captured by said imaging apparatus (11).

20 Claims, 1 Drawing Sheet

(51) Int. Cl.

| | |
|---|---|
| ***B60W 60/00*** | (2020.01) |
| ***G06V 10/764*** | (2022.01) |
| ***G06V 10/82*** | (2022.01) |
| *B60W 50/14* | (2020.01) |

(52) U.S. Cl.
CPC ............ *G06V 10/764* (2022.01); *G06V 10/82* (2022.01); *B60W 2050/143* (2013.01); *B60W 2050/146* (2013.01); *B60W 2420/403* (2013.01); *B60W 2556/20* (2020.02)

(58) Field of Classification Search
CPC ....... B60W 2556/20; B60W 2050/143; B60W 2050/146; B60W 2420/403
See application file for complete search history.

(56) References Cited

U.S. PATENT DOCUMENTS

| | | | | |
|---|---|---|---|---|
| 2017/0270377 | A1* | 9/2017 | Fotta | G06V 20/582 |
| 2018/0225530 | A1 | 8/2018 | Kunze et al. | |
| 2018/0239972 | A1* | 8/2018 | Biemer | G06V 20/582 |
| 2018/0260639 | A1* | 9/2018 | Kapach | G06V 10/751 |
| 2018/0373963 | A1* | 12/2018 | Lo | G06V 10/82 |
| 2019/0279007 | A1* | 9/2019 | Zinner | G08G 1/09623 |
| 2020/0034641 | A1* | 1/2020 | Sergeev | G08G 1/09623 |
| 2022/0207885 | A1* | 6/2022 | Ansari | H04L 9/14 |

OTHER PUBLICATIONS

European Search Report—EP20179761—Search Authority—The Hague—Jul. 22, 2021.

International Search Report and Written Opinion—PCT/EP2021/065158—ISA/EPO—Jul. 22, 2021.

Natarajan S., et al., "Traffic Sign Recognition Using Weighted Multi-Convolutional Neural Network", IET Intelligent Transport Systems, The Institution of Engineering and Technology, Michael Faraday House, Six Hills Way, Stevenage, Herts, SG1 2AY, UK, vol. 12, No. 10, Dec. 1, 2018, XP006081592, pp. 1396-1405.

Sesmero M.P., et al., "Specialized Ensemble of Classifiers for Traffic Sign Recognition", Computational and Ambient Intelligence, [Lecture Notes in Computer Science], Springer Berlin Heidelberg, Berlin, Heidelberg, Jun. 20, 2007, XP019080643, pp. 733-740.

* cited by examiner

VISION SYSTEM AND METHOD FOR A MOTOR VEHICLE

CROSS-REFERENCE TO RELATED APPLICATION

This application is a national stage application, filed under 35 U.S.C. § 371, of International Patent Application No. PCT/EP2021/065158, filed Jun. 7, 2021, which claims the benefit of and priority to European Application No. 20179761.0, filed Jun. 12, 2020. The disclosures of each of these applications are expressly incorporated herein by reference to their entireties.

DETAILED DESCRIPTION

The invention relates to a vision system for a motor vehicle, comprising an imaging apparatus adapted to capture images from a surrounding of the motor vehicle, and a data processing unit adapted to perform image processing on images captured by said imaging apparatus, wherein said data processing unit comprises a traffic sign detector adapted to detect traffic signs in images captured by said imaging apparatus through image processing and a decision section. The invention relates also to a corresponding vision method.

Traffic sign recognition is a key component in most modern vehicles. The signs are typically detected and classified using machine learning techniques such as deep neural networks. The performance under normal conditions is generally very good; however, when a rare misclassification occurs it may have severe implications. It is possible to complement the image based information with map data; however, this is not always available or the quality may be too low. As such, current autonomous and semi-autonomous driving vehicles may not be sufficiently safe outside well-mapped areas.

In addition, reliability factors such as weather (raining, snowing, etc.), time of day (day/night), etc. may be used to determine the reliability of the current classifications, see U.S. Pat. No. 8,918,277 B2. Using a reliability factor however only gives an estimate of the current image-based classification performance in general; it does not address the main problem of individual signs with an altered appearance.

Of special concern for autonomous vehicles is a situation where the driver is not paying attention to the surroundings, and the misclassification of a sign can lead to potentially dangerous situations. For example, a 30 km/h speed sign obstructed by dirt, being misclassified as an 80 km/h speed sign, could cause the vehicle to accelerate far beyond the speed limit.

Additional risks arise from vandalism and criminal behavior such as placing real signs in inappropriate places or modifying existing signs to cause them to be misclassified in a dangerous way. A special case of this is the possible use of adversarial attacks on machine learning based classifiers.

The problem underlying the present invention is to provide a vision system having a reliable traffic sign recognition suited for autonomous motor vehicles and self-driving cars.

The invention solves this problem with the features of the independent claims. According to the invention, the data processing unit comprises a traffic sign estimator that is adapted to estimate validity information of one or more traffic signs in an image captured by the imaging apparatus. The validity information may for example comprise a probability of one or more specific traffic signs being present in an image captured by the imaging apparatus. Alternatively or in addition, the validity information may for example comprise information whether a traffic sign in an image captured by the imaging apparatus is valid or not, which could be denoted for example by a corresponding flag. A traffic sign may be a traffic sign on a post, a road sign/road marking, or a sign on a traffic light, and thus may be located anywhere (on a traffic post, on the road, on a traffic light) and being visible from the imaging apparatus and/or the ego vehicle.

Typically, human drivers are not susceptible to altered signs due to their ability to use common sense to validate the plausibility of a sign based on its surrounding. As such it is unlikely for a human driver to misinterpret for example a dirty 30 km/h sign in an urban environment as an 80 km/h sign. This human common sense is based on the combination of surrounding features such as the road type, road curvature, existence of sidewalks, buildings, etc. This common sense is what the invention attempts to replicate technically for an automatic vision system.

Preferably, the traffic sign estimator estimates the traffic sign validity information based on at least one entire image from the imaging apparatus, i.e. holistically. In this preferred embodiment, the traffic sign estimator may be denoted as holistic traffic sign estimator.

The information provided by the traffic sign estimator may be compared with, or combined with, information provided by the traffic sign detector/classifier. Based on this combined information, suitable actions may be taken by a decision section of the data processing unit, for example to combine the information of the traffic sign detector and the traffic sign estimator to initiate a suitable response, to accept the traffic sign in further processing in the data processing unit, ignore the traffic sign in further processing in the data processing unit, output a control signal to a signaling device to suggest an alternative action to the driver, and/or output a control signal to a signaling device to signal to the driver to take over control of the vehicle.

The invention is applicable to autonomous driving, where the ego vehicle is an autonomous vehicle adapted to drive partly or fully autonomously or automatically, and driving actions of the driver are partially and/or completely replaced or executed by the ego vehicle.

In a preferred embodiment, when a discrepancy between a detected/classified traffic sign and the estimation by the traffic sign estimator is found by the decision section, the decision section determines which of the sign interpretations offered by the traffic sign detector and the traffic sign estimator is appropriate, or most appropriate, wherein further processing by said data processing unit is based on said traffic sign considered appropriate/most appropriate. In a preferred embodiment, under a plurality of probable speed signs estimated by the traffic sign estimator, the speed sign with the lowest speed is considered the appropriate/most appropriate by the data processing unit, and thus chosen to be the true speed sign for further processing. In other words, further processing in the data processing unit is preferably based on choosing the detected traffic sign to have said lowest probable speed, i.e. the lowest speed exceeding a predefined probability threshold. Preferably, the decision section sends out a control signal to control the motor vehicle to perform a suitable action in conformity with said traffic sign considered appropriate/most appropriate. For example, the control signal may control the braking system of the motor vehicle to brake and thus to decelerate the motor vehicle until the speed of the appropriate/most appropriate speed sign has been reached.

The invention may be deployed to estimate validity information, like the probability, or holistic probability, of any type of traffic sign, for example stop signs, yield signs, priority signs, etc.

Preferably, the data processing unit comprises a road marking estimator adapted to estimate validity information, like the probability, of one or more road markings, and to compare the road marking validity information with corresponding road marking detections detected and classified by a road marking detector/classifier. The invention may thus be deployed to estimate validity information of road markings, for example e.g. turn left, turn right, bus-lane, speed etc., and to compare the (holistic) validity information with classified road marking detections in an analogous way as for traffic signs.

The invention may be deployed in a motor vehicle where the driver can take over from the autonomous driving system. In this scenario, the decision section may send out a control signal to turn off an autonomous driving system and to return control to the driver if it finds an inconsistency between a classified detected traffic sign and the estimation by the traffic sign estimator.

Preferably, the traffic sign estimator is a classifier, and more preferably a trained classifier. Any kind of machine learning based classifier may be utilized for the traffic sign estimator, such as a Neural Network of any kind, like Convolutional Neural Network or Recurrent Neural Network, Support Vector Machines, Boosting classifier, Bag-Of-Words classifier.

According to an aspect of the invention, training the traffic sign estimator is performed on training images that do not include information on the traffic sign of interest, i.e., a currently valid traffic sign. For example, if an image has been taken on a road where a speed sign limits the speed to 80 km/h, the training image shall not contain this information. Generally, a traffic sign estimator, in particular a neural network, is trained to predict, preferably based on an entire image, the most recent traffic sign that has been passed and is thus valid for the respective image.

In the case of speed signs, or more generally traffic signs of a specific type, it is suitable to select images from a point where the sign has been passed by the ego vehicle and is no longer visible to the imaging system, until right before the next speed sign, or traffic sign of the same specific type, comes into sight. For such training images, a traffic sign estimator, in particular a neural network, is trained to predict, preferably based on an entire image, the most recent speed sign, or traffic sign of the specific type, that has been passed.

An alternative approach to train the (holistic) traffic sign estimator is to use images where the traffic signs of interest remain visible, but all signs are masked, blurred or replaced with random signs, in order to avoid having the (holistic) classifier learning to detect actual signs, and instead force it to classify the actual surroundings.

In the following the invention shall be illustrated on the basis of preferred embodiments with reference to the accompanying drawings, wherein.

Figure 1:
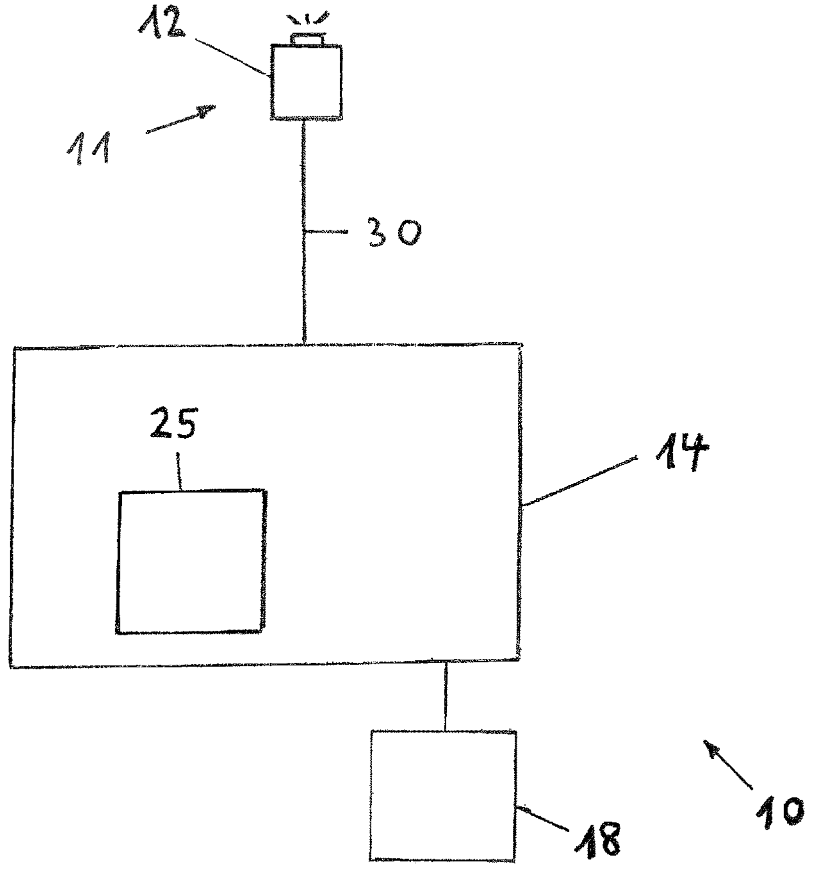
FIG. 1 shows a schematic drawing of a vision system.

The vision system 10 is preferably an on-board vision system 10 which is mounted, or to be mounted, in or to a motor vehicle. The vision system 10 comprises an imaging apparatus 11 for capturing images of a region surrounding the motor vehicle, for example a region in front of the motor vehicle. The imaging apparatus 11, or parts thereof, may be mounted for example behind the vehicle windscreen or windshield, in a vehicle headlight, and/or in the radiator grille. Preferably the imaging apparatus 11 comprises one or more optical imaging devices 12, in particular cameras, preferably operating in the visible wavelength range, or in the infrared wavelength range, or in both visible and infrared wavelength range. In some embodiments the imaging apparatus 11 comprises a plurality of imaging devices 12 in particular forming a stereo imaging apparatus 11. In other embodiments only one imaging device 12 forming a mono imaging apparatus 11 can be used. Each imaging devices 12 preferably is a fixed-focus camera, where the focal length f of the lens objective is constant and cannot be varied.

The imaging apparatus 11 is coupled to a data processing unit 14 (or electronic control unit, ECU) which is preferably an on-board data processing unit 14. The data processing unit 14 is adapted to process the image data received from the imaging apparatus 11. The data processing unit 14 is preferably a digital device which is programmed or programmable and preferably comprises a microprocessor, a microcontroller, a digital signal processor (DSP), and/or a microprocessor part in a System-On-Chip (SoC) device, and preferably has access to, or comprises, a digital data memory 25. The data processing unit 14 may comprise a dedicated hardware device, like a Field Programmable Gate Array (FPGA), an Application Specific Integrated Circuit (ASIC), a Graphics Processing Unit (GPU) or an FPGA and/or ASIC and/or GPU part in a System-On-Chip (SoC) device, for performing certain functions, for example controlling the capture of images by the imaging apparatus 11, receiving the signal containing the image information from the imaging apparatus 11, rectifying or warping pairs of left/right images into alignment and/or creating disparity or depth images. The data processing unit 14 may be connected to the imaging apparatus 11 via a separate cable or a vehicle data bus. In another embodiment the ECU and one or more of the imaging devices 12 can be integrated into a single unit, where a one box solution including the ECU and all imaging devices 12 can be preferred. All steps from imaging, image processing to possible activation or control of a safety device 18 are performed automatically and continuously during driving in real time.

In another embodiment, the above described image processing, or parts thereof, are performed in the cloud. Consequently, the data processing unit 14, or parts thereof, may be realized by cloud processing resources.

Image and data processing carried out in the data processing unit 14 advantageously comprises identifying and preferably also classifying possible objects (object candidates) in front of the motor vehicle, such as pedestrians, other vehicles, bicyclists and/or large animals, tracking over time the position of objects or object candidates identified in the captured images, and activating or controlling at least one safety device 18 depending on an estimation performed with respect to a tracked object, for example on an estimated collision probability.

The safety device 18 may comprise at least one active safety device and/or at least one passive safety device. In particular, the safety device 18 may comprise one or more of: at least one safety belt tensioner, at least one passenger airbag, one or more restraint systems such as occupant airbags, a hood lifter, an electronic stability system, at least one dynamic vehicle control system, such as a brake control system and/or a steering control system, a speed control system; a display device to display information relating to a detected object; a warning device adapted to provide a warning to a driver by suitable optical, acoustical and/or haptic warning signals.

Figure 2:
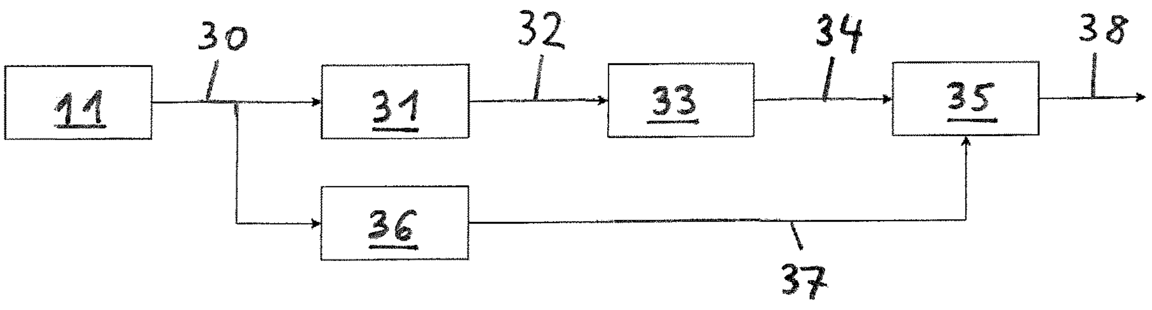
FIG. 2 shows a diagram illustrating functional elements in the data processing unit of the vision system.

In the following, a process of traffic sign verification under the present invention is explained with reference to FIG. 2. All method steps related to the functional units 31-38 are performed in real time during driving in the data processing unit 14.

Images 30 captured by the imaging apparatus 11 of a motor vehicle are forwarded to a traffic sign detector/classifier 31, 33, which is known per se, and in parallel also to an inventive holistic traffic sign estimator 36.

The traffic sign detector 31 is adapted to detect traffic signs in the input images. Traffic signs 32 detected by the traffic sign detector 31 are forwarded to a traffic sign classifier 33 adapted to classify a detected traffic sign into one or more of a predefined number of categories. The traffic sign classifier 33 is known per se, and usually performs classification on a small image patch in a so-called bounding box closely around a detected traffic sign. Classified traffic signs 34 are forwarded to a decision section 35. The traffic sign detector 31 and/or classifier 33 may perform tracking a detected traffic sign over a plurality of image frames. The traffic sign detector 31 and the traffic sign classifier 33 may be a single unit adapted to detect and classify traffic signs simultaneously.

The holistic traffic sign estimator 36 has been trained in advance, and is adapted to output, for each entire image from the imaging apparatus 11, validity information 37 of one or more traffic signs in the input image 30, for example a probability 37 that one or more specific, i.e. predefined, traffic signs is present in the input image 30. More specifically, the holistic traffic sign estimator 36 can estimate and output validity information 37, like a probability or a validity/invalidity flag value, for each of a plurality of predefined traffic signs to be present in the input image 30. The one or more estimated validity values or probabilities 37 are forwarded to the decision section 35. The decision section 35 compares or combines the validity information 37 provided by the traffic sign estimator 36 with information 34 provided by the traffic sign detector 31 and/or traffic sign classifier 33, and initiates a suitable action.

In the following, a practical example is discussed where the holistic traffic sign estimator 36 is restricted to estimating speed signs, and therefore is a holistic speed sign estimator 36. Specifically, the holistic speed sign estimator 36 is a trained classifier, and may be adapted to classify an entire input image into one or more of, for example, five categories:

containing a 30 km/h speed sign, containing a 50 km/h speed sign, containing a 60 km/h speed sign, containing an 80 km/h speed sign, containing none of these speed signs. It goes without saying that the number of speed signs can be different from five, and/or the speed signs which can be estimated from by the holistic speed sign estimator 36 can involve other speed signs than the above mentioned.

It may be assumed that the traffic sign detector/classifier 31/33 detects and identifies an 80 km/h speed sign in a particular input image 30. The holistic speed sign estimator 36 estimates the following probabilities for the input image: 5% for 30 km/h speed sign, 15% for 50 km/h speed sign, 40% for 60 km/h speed sign, 30% for 80% speed sign, and 10% for none of these speed signs.

The decision section 35 compares or combines the above probabilities 37 with the finding by the speed sign detector/classifier 31, 33, and can initiate one or more of the following actions based on this comparison.

(i) The decision section 35 may accept the detected traffic sign in the further processing, either as an 80 km/h traffic sign as classified by the speed sign detector/classifier 31, 33, or as a 60 km/h speed sign as estimated (with highest probability) by the holistic speed estimator 36.

(ii) The decision section 35 may ignore the detected traffic sign in the further processing.

(iii) The decision section 35 may output a control signal 38 to a signaling device 18 (see FIG. 1) to suggest an alternative action to the driver, like taking care of speed limits.

(iv) The decision section 35 may output a control signal 38 to the signaling device 18 to signal to the driver to take over control of the vehicle.

(v) The decision section 35, determining an inconsistency between the speed sign (80 km/h) detected and classified by the speed sign detector/classifier 31, 33 and the speed sign (60 km/h) having the highest probability according to the holistic speed sign estimator 36, may determine which of the sign interpretations offered by the traffic sign detector/classifier 31, 33 and the traffic sign estimator 36 is the appropriate/most appropriate. In one embodiment, the speed sign (60 km/h) having the highest probability according to the holistic speed sign estimator 36 may be considered appropriate/most appropriate. In a preferred embodiment, the speed sign (50 km/h) with the lowest speed and a probability over a predetermined threshold (for example 10%) is considered appropriate/most appropriate, here disregarding the 30 km/h speed sign the probability of which is too low to be considered true. The decision section initiates a suitable action based on the appropriate/most appropriate speed sign, for example braking the motor vehicle to decelerate it to the speed of the appropriate/most appropriate speed sign.

As is evident from the above, the data processing unit 14 preferably comprises two different classifiers, namely the conventional traffic sign classifier 33 performing classification only on a small image patch around a detected traffic sign, and the inventive holistic traffic sign estimator 36 which advantageously performs classification on an entire input image.

The invention claimed is:

1. A system comprising:

an imaging apparatus configured to capture images from a surrounding of a motor vehicle; and at least one processor configured to:

detect one or more traffic signs in each of the images captured by the imaging apparatus;

generate, using a first classifier, traffic sign classifier information based on a first portion of each of the images including the detected one or more traffic signs;

generate, using a second classifier, validity information of the detected one or more traffic signs based on a second portion of each of the images excluding that masks the detected one or more traffic signs in each of the images captured by the imaging apparatus;

compare the traffic sign classifier information and the validity information; and output a control signal based in part on comparing the traffic sign classifier information and the validity information.

2. The system of claim 1, wherein the at least one processor is configured to generate the validity information based on an entire image of each the images captured by the imaging apparatus.

3. The system of claim 1, wherein the at least one processor is configured to output the control signal based in part on the validity information.

4. The system of claim 1, wherein the at least one processor is configured to:
- ignore at least one of the detected one or more traffic signs; and
- output the control signal to at least one of:
  - suggest an alternative action to a driver of the motor vehicle; or
  - signal to the driver to take over control of the motor vehicle.

5. The system of claim 1, wherein the traffic sign classifier information and the validity information each include corresponding one or more traffic sign interpretations, and wherein the at least one processor is configured to:
- determine, based on the comparison, whether a discrepancy exists between a traffic sign interpretation of the one or more traffic sign interpretations of the traffic sign classifier information and a corresponding traffic sign interpretation of the one or more traffic sign interpretations of the validity information; and
- for each determined discrepancy and based on the traffic sign classifier information and the validity information, determine which of the one or more traffic sign interpretations included in the traffic sign classifier information and the validity information is appropriate.

6. The system of claim 5, wherein each of the one or more traffic sign interpretations of the validity information is associated with a probable traffic speed sign, and wherein the at least one processor is configured to determine a traffic sign interpretation of the one or more traffic sign interpretations associated with a traffic speed sign with a lowest speed is appropriate.

7. The system of claim 5, wherein the at least one processor is configured to cause the motor vehicle to perform an action in conformity with the traffic sign interpretation that is considered appropriate.

8. The system of claim 1, wherein the one or more traffic signs includes a road marking, and wherein the at least one processor is configured to compare the validity information associated with the road marking with corresponding traffic sign classifier information associated with the road marking.

9. The system of claim 1, wherein the at least one processor is further configured to turn off an autonomous driving system of the motor vehicle and to return control to a driver of the motor vehicle based on a determination that there is an inconsistency between the traffic sign classifier information and the validity information.

10. The system of claim 1, wherein the at least one processor is configured to apply a trained classifier to each of the images captured by the imaging apparatus to generate the traffic sign classifier information.

11. A computer-implemented method comprising:
- capturing, using an imaging apparatus, images from a surrounding of a motor vehicle;
- detecting one or more traffic signs in each of the images captured using the imaging apparatus;
- generating, using a first classifier, traffic sign classifier information based on a first portion of each of the images including the detected one or more traffic signs;
- generating, using a second classifier, validity information of the detected one or more traffic signs based on a second portion of each of the images that masks the detected one or more traffic signs in each of the images captured by the imaging apparatus;
- comparing the traffic sign classifier information and the validity information; and
- outputting a control signal based in part on comparing the traffic sign classifier information and the validity information.

12. The computer-implemented method of claim 11, wherein generating the validity information is based on an entire image of each of the images captured by the imaging apparatus.

13. The computer-implemented method of claim 11, further comprising:
- outputting the control signal based in part on the validity information.

14. The computer-implemented method of claim 11, wherein outputting the control signal further includes combining the traffic sign classifier information and the validity information.

15. The computer-implemented method of claim 11, wherein the traffic sign classifier information and the validity information each include corresponding one or more traffic sign interpretations, and wherein outputting the control signal further includes:
- determining whether a discrepancy exists between a traffic sign interpretation of the one or more traffic sign interpretations of the traffic sign classifier information and a corresponding traffic sign interpretation of the one or more traffic sign interpretations of the validity information based on the comparison; and
- for each determined discrepancy and based on the traffic sign classifier information and the validity information, determining which of the one or more traffic sign interpretations included in the traffic sign classifier information and the validity information is appropriate.

16. The computer-implemented method of claim 15, wherein each of the one or more traffic sign interpretations of the validity information is associated with a probable traffic speed sign, and wherein the computer-implemented method further comprises, determining a traffic sign interpretation of the one or more traffic sign interpretations associated with a traffic speed sign with a lowest speed is appropriate.

17. The computer-implemented method of claim 15, further comprising causing the motor vehicle to perform an action in conformity with the traffic sign interpretation considered appropriate.

18. A non-transitory, machine-readable medium having stored thereon a plurality of executable instructions, that when executed by a processor, the plurality of executable instructions comprising instructions to:
- obtain images captured by an imaging apparatus from a surrounding of a motor vehicle;
- detecting one or more traffic signs in each of the images captured using the imaging apparatus;
- generating, using a first classifier, traffic sign classifier information based on a first portion of each of the images including the detected one or more traffic signs;
- generating, using a second classifier, validity information of the detected one or more traffic signs based on a second portion of each of the images excluding that masks the detected one or more traffic signs in each of the images captured by the imaging apparatus;
- comparing the traffic sign classifier information and the validity information; and
- outputting a control signal based in part on comparing the traffic sign classifier information and the validity information.

19. The computer-implemented method of claim 11, further comprising:

ignoring at least one of the detected one or more traffic signs; and outputting the control signal to at least one of:

suggest an alternative action to a driver of the motor vehicle; or signal to the driver to take over control of the motor vehicle.

20. The computer-implemented method of claim 11, wherein the one or more traffic signs includes a road marking, and wherein the computer-implemented method further comprises comparing the validity information associated with the road marking with corresponding traffic sign classifier information associated with the road marking.

* * * * *